Sept. 8, 1936. E. C. BOOTH 2,053,941
AUTOMOBILE RADIO SET
Filed March 7, 1934 3 Sheets-Sheet 2
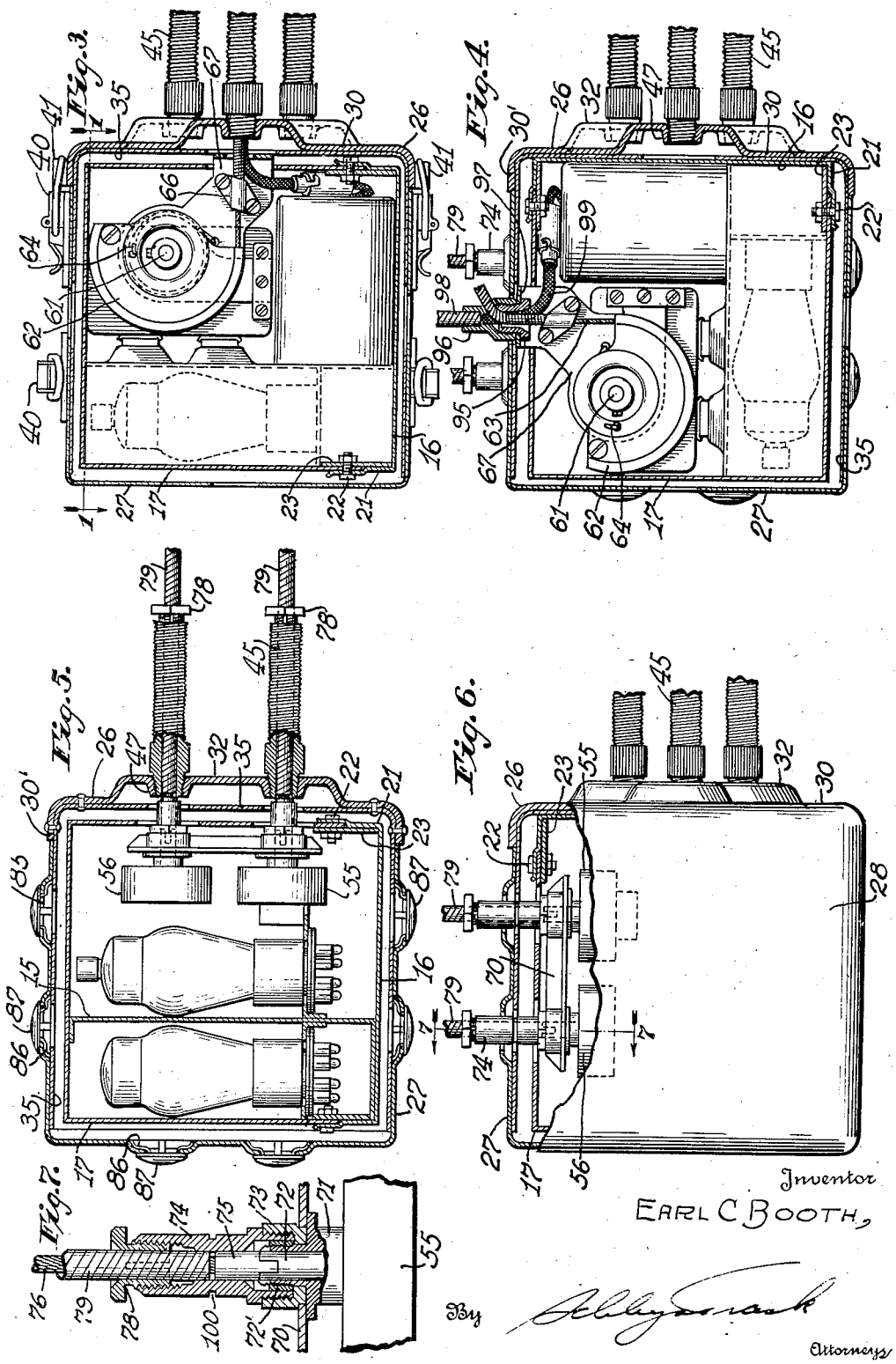
Inventor
EARL C BOOTH,
By
Attorneys Sept. 8, 1936.　　　　E. C. BOOTH　　　　2,053,941
AUTOMOBILE RADIO SET
Filed March 7, 1934　　　　3 Sheets-Sheet 3
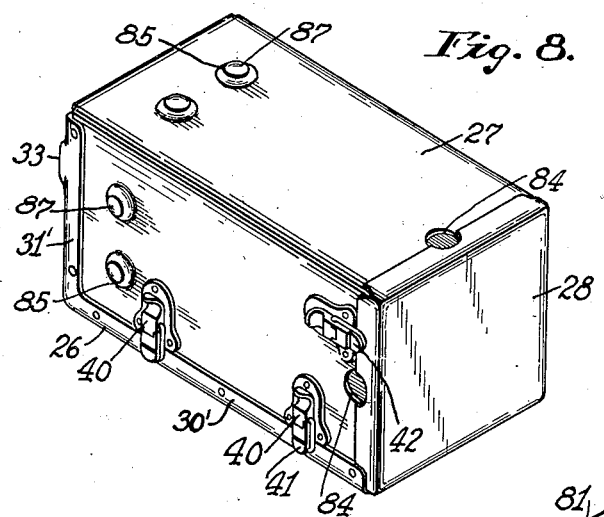
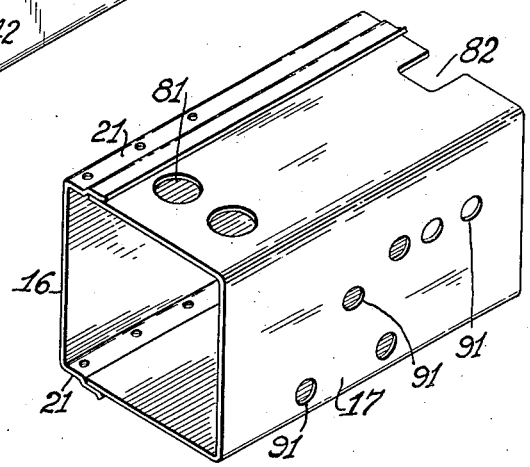
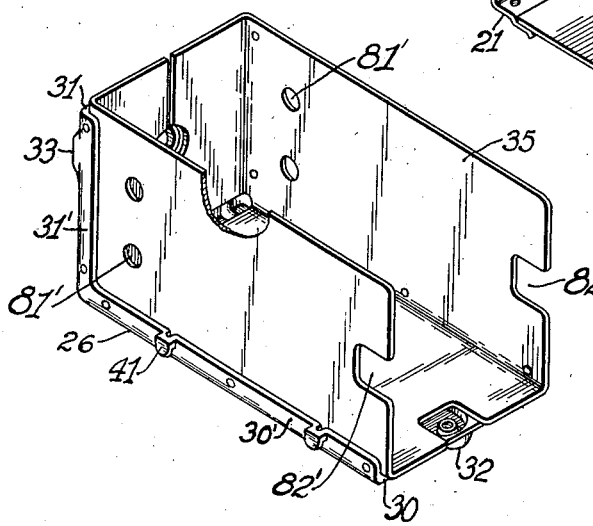
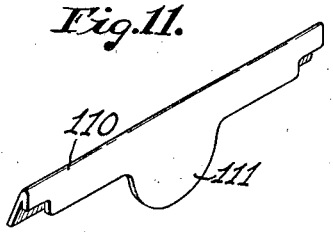
Inventor
EARL C. BOOTH,
By
Attorney Patented Sept. 8, 1936

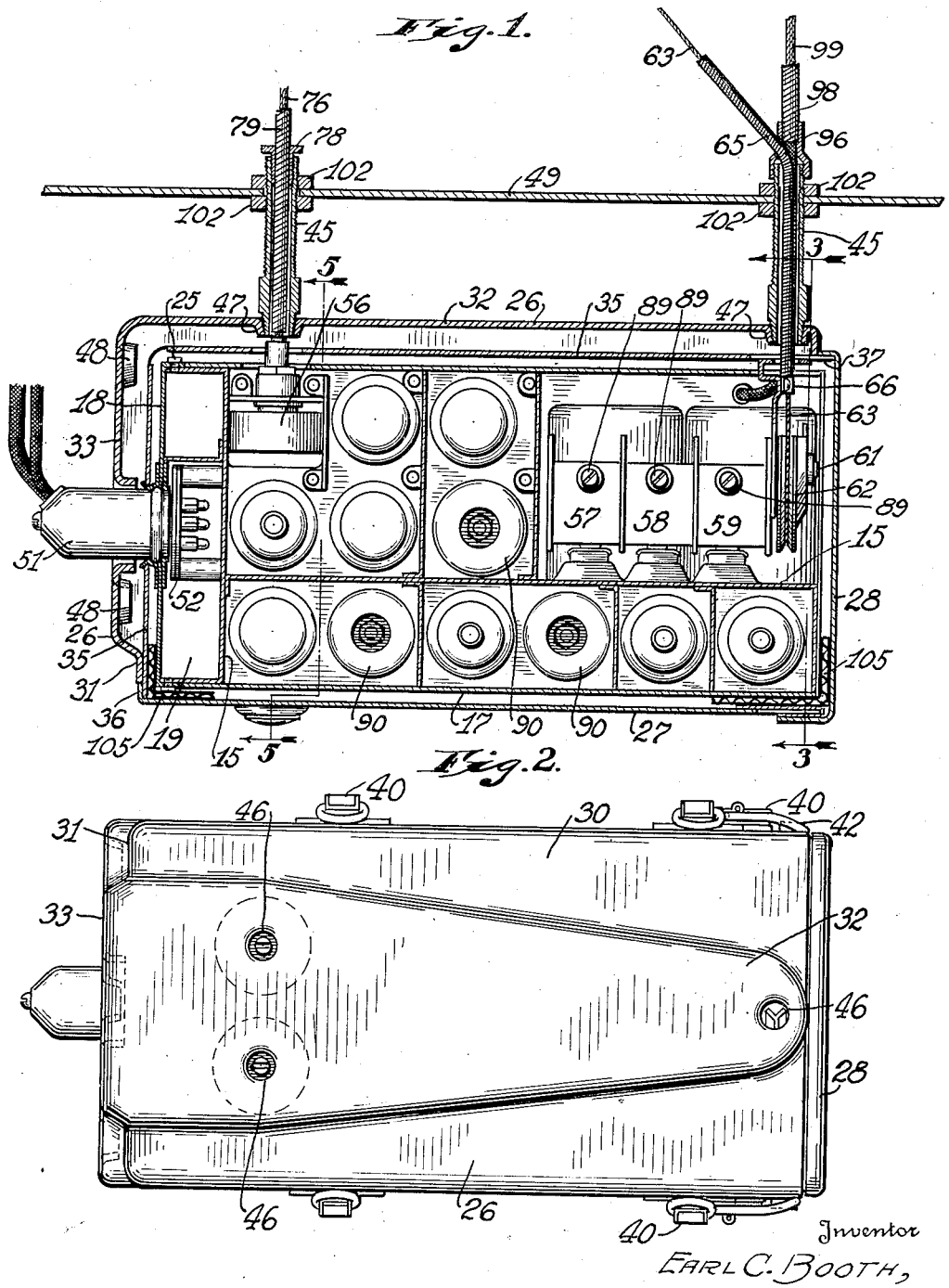

2,053,941

UNITED STATES PATENT OFFICE 2,053,941

AUTOMOBILE RADIO SET

Earl C. Booth, Columbus, Ind., assignor to Noblitt-Sparks Industries, Inc., Columbus, Ind., a corporation of Indiana Application March 7, 1934, Serial No. 714,411

8 Claims. (Cl. 250—16)

It is the primary object of my invention to produce an arrangement for the mounting and shielding of an automobile radio set which will increase the flexibility of installation and facilitate the mounting of the set in any place in the automobile where there is space for it. A further object of my invention is to provide for an automobile radio set a combined casing and support which can be opened to provide ready access to the set.

In carrying out my invention I mount the electrical apparatus of the set upon a frame and provide a shielding shell of sheet-metal adapted to enclose the frame and the apparatus mounted upon it. The shielding shell is of a generally parallelepipedal shape and is adapted to be received within an enclosing casing. The casing is composed of two or more parts, one of which is adapted to be secured in any desired position in the automobile, while the other or others are removable to permit access to the radio set. The shielding shell is substantially square in cross-section so that it and the electrical apparatus within it can be placed in four different positions within the casing, and the casing is provided with a set of openings so arranged that the necessary electrical and mechanical connections to the apparatus within the shell can be made in any position.

The accompanying drawings illustrate my invention: Fig. 1 is a horizontal section on the line 1—1 of Fig. 3 showing the radio set mounted on a partition which may be the dash of an automobile; Fig. 2 is an elevation of the rear side of the casing; Fig. 3 is a vertical section on the line 3—3 of Fig. 1; Fig. 4 is a view similar to Fig. 3 but showing the set in a different position within the casing; Fig. 5 is a section on the line 5—5 of Fig. 1; Fig. 6 is an end elevation of the casing with parts thereof broken away to show, in section on the line 5—5 of Fig. 1, certain parts of the set and its enclosing casing in a position different from that shown in Fig. 5; Fig. 7 is a fragmental sectional view on the line 7—7 of Fig. 6; Fig. 8 is an isometric view of the outer casing; Fig. 9 is an isometric view of parts of the shielding shell; Fig. 10 is an isometric view of the base portion of the casing; and Fig. 11 is an isometric view of an auxiliary shielding member.

The electrical apparatus used in a device embodying my invention is mounted upon a frame 15 which is built up of flanged sheet-metal partitions to provide the necessary compartments and support for the electrical apparatus of the radio set, only the larger elements of which are shown in the drawings. The precise form of the frame 15 will vary with the character of the electrical apparatus constituting the radio set and may take any desired form. Conveniently, however, it is so arranged that in cross-section it is approximately square exteriorly.

For the frame 15 and the electrical apparatus mounted upon it, I provide a shielding shell consisting of three parts. The two shell-parts 16 and 17 shown in Fig. 9 cover the four sides of the chassis while the third shell-part 18, a generally square cap having its edges bent at right-angles to form flanges and shown in assembled position in Fig. 1, covers the end of the chassis. The shell-part 18 in co-operation with a transverse wall and longitudinally extending flanges on the four sides of the frame 15 forms a compartment 19 which may be utilized for the mounting of suppressor units (not shown). The shell-part 16 is in the form of a flat sheet-metal plate having along its opposite longitudinal edges parallel flanges 21 the edges of which are offset outwardly to provide space for the reception of the free edges of the side walls of the shell-part 17, as is clear from Figs. 3, 4, 5, and 9. Bolts 22 passing through the flanges 21 on the shell-part 16 and through flanges 23 on the chassis-frame 15 serve to secure the shell-part 16 to the chassis-frame. The end shell-part 18 is secured to the chassis-frame by means of screws or bolts 25 (Fig. 1).

For the reception of the shielding shell 16—17—18 and the apparatus contained within it, I provide a casing consisting of a base 26, a cover 27, and an end-closure 28. The base 26, which is constructed of relatively heavy sheet-metal, provides a back-wall 30 and an end-wall 31 for the casing. Along the side edges, the walls 30 and 31 are bent at right angles to provide flanges 30' and 31'. In addition, the center portions of the back and end walls 30 and 31 are offset outwardly, as indicated at 32 and 33 to increase their stiffness. The base 26 may be provided with a lining 35 of sheet-metal which has a back wall in contact with the back wall 30, side walls secured to the flanges 30' and projecting beyond them, and an end wall lying within the end wall 31 of the base.

The cover 27 consists of a single piece of sheet-metal bent to provide front and side walls. The front wall has a lip 36 which fits over the front edge of the end wall of the lining 35, as indicated in Fig. 1, and the side walls of the cover are trimmed to abut against the edges of the flanges 30' and 31', as shown in Figs. 3 and 5.

The end-closure 28 is a substantially square piece of sheet-metal the edges of which are bent inwardly to provide parallel flanges overlying the front and side walls of the cover 27 and the extreme end of the back wall of the lining 35, which projects slightly beyond the end of the back wall 30 of the base as indicated at 37 in Fig. 1.

The three parts 26, 27, and 28 of the casing are releasably held together by any convenient means. I prefer to employ for this purpose the latches 40 shown in Figs. 2, 3, and 8, which are generally similar to those used upon luggage. Two of the latches 40 may be mounted on each side wall of the cover 27 for co-operation with abutments 41 formed in the adjacent flange 30' of the back wall of the base to hold the cover in association with the base; and one of the latches 40 may be mounted on each side wall of the cover 27 in position to co-operate with an abutment 42 formed upon the adjacent flange of the cover 28, all as shown in Fig. 8.

The casing 26—27—28 may be adapted for mounting in any convenient way, but I prefer the arrangement illustrated in the drawings. There, the base 26 of the casing is adapted to have secured to it three mounting screws or studs 45. At the place where each of such screws is to be attached, the metal of the base is pierced and deformed inwardly to provide a circular opening 46 having around its periphery an inwardly projecting, screw-threaded flange 47. If the holes 46 are located in the offset portion 32 of the back wall 30 of the base, the flanges 47 will lie outside the back wall of the lining 35 and will not interfere with the apparatus within the casing. Conveniently, the screw-threads of the flanges 47 are tapered pipe-threads, so that no nut is necessary to secure the studs or screws 45 in place.

To increase the flexibility of installation, a set of screw-threaded stud-receiving openings similar to the openings 46 may be provided, as indicated at 48 in the offset portion 33 of the end wall 31 of the base. By means of the two sets 47 and 48 of screw-threaded flanges, either the back wall 30 or the end wall 31 of the base may be mounted against a support such as the dash 49 shown in Fig. 1.

The shielding shell 16—17—18, the casing, and its lining 35 are provided with openings for the passage of means affording electrical and mechanical connection with portions of the radio set located outside the casing. Conveniently, all the electrical connections to parts of the set outside the casing, with the exception of the antenna connection, are made through the medium of a plug 51 which passes through openings in the end wall of the base, in the end wall of the lining 35, and in the shield-part 18 into co-operation with a socket 52 located within the compartment 19 and supported from the frame 15, as is clear from Fig. 1. Preferably, the socket 52 is located on the longitudinal axis of the frame 15 so that it will be in alinement with the opening in the end wall of the casing irrespective of the position occupied by the frame 15 and its shielding shell within the casing.

The set illustrated in the drawings includes three pieces of apparatus which, in the operation of the set, require mechanical adjustment. These are the volume-control and tone-control rheostats 55 and 56 and the gang tuning condensers 57, 58, and 59.

Preferably, the adjustment of these three elements is effected by means of the control unit illustrated in my copending application Serial No. 707,569, filed January 20, 1934, Patent No. 2,046,605, July 7, 1936. This control unit embodies Bowden-wire mechanism for effecting tuning adjustment of the set and two flexible shafts which are adapted to be operatively connected to the rheostats 55 and 56.

The adjustable elements of the tuning condensers, 57, 58, and 59 are all mounted on a common shaft 61 which carries, near one end of the frame 15, a grooved pulley 62 to which one end of the Bowden-wire 63 is passed. A torsion spring 64 acts between the pulley 62 and a fixed point and tends to rotate the shaft 61 in one direction, the Bowden-wire 63 serving to rotate it in the other direction. The Bowden-wire extends through an enclosing flexible casing 65 to the control unit, as set forth in my co-pending application above referred to, the end of the enclosing casing 65 being secured by a clip 66 to a bracket 67 supported by the frame 15.

The mounting of the rheostats 55 and 56 is perhaps best shown in Fig. 7. A bracket 70, supported upon the frame 15, has a circular opening in it at the place where each of the rheostats 55 and 56 is to be attached. Each of the rheostats has a stationary central flanged hub 71 coaxially with which is mounted a shaft 72 by the rotation of which the rheostat is adjusted. The outer end of the hub 71, which passes through the opening in the bracket 70, is screw-threaded for the reception of a clamp-nut 72' which clamps the flange of the hub 71 against the back face of the bracket and a collar 73 against the front face of the bracket. The collar 73 is provided with internal screw-threads for the reception of the externally threaded end of a sleeve 74 which provides bearing support for a rotatable connecting member 75. The member 75 is permanently connected to the end of a flexible shaft 76 and also has a tongue-and-groove connection with the end of the rheostat-shaft 72, whereby rotation of the flexible shaft 76 is availed of to adjust the rheostat.

At its outer end, the sleeve 74 is counterbored and internally screw-threaded for the reception of a clamping nut 78. This clamping nut has an axial opening which receives the sheath 79 of the flexible shaft 76 and its inner end is provided with one or more longitudinal slots so that, as it is tightened, it will collapse and grip the sheath 79. The two sheaths 79 and the shafts within them extend to the control unit, as set forth in my co-pending application above referred to.

For the passage of the sleeves 74, the part 17 of the shielding shell is provided with a pair of openings 81 in one of its side walls. The same side wall is provided near the opposite end with a notch 82 through which the Bowden-wire casing 65 extends. The casing lining 35 has in its three longitudinal walls openings 81' for the passage of the sleeves 74 and notches 82' for the passage of the Bowden-wire casing 65.

As previously indicated, I contemplate that the shielding shell 16—17 will be substantially square in cross-section—that is, that its two cross-sectional over-all dimensions will be substantially equal. This enables the shielding shell and the set within it to be placed in the casing in any of four possible positions. To take advantage of this possibility, it is of course necessary that all four walls of the casing and its lining 35 be provided with openings for the passage of the flexible shafts and the Bowden-wire.

In order that the flexible shafts and the Bowden-wire may pass through the back wall of the casing, I make the studs 45 hollow and arrange the openings 46 in which such studs are mounted in line with the rheostat-shafts 72 and with the notch 82 in the shielding shell, respectively. Each of the three walls of the casing-lining 35 is provided with a notch for the passage of the Bowden-wire and with holes for the passage of the flexible shafts. Near each end, each of the walls of the cover 27 is notched as indicated at 84, as shown in Fig. 8, and the corresponding flanges of the end-closure 28 are correspondingly notched for the passage of the Bowden-wire. Similarly, pairs of openings 85 are provided in each of the three walls of the cover 27 for the passage of the flexible shafts. Conveniently, the metal surrounding each of the openings 85 is deformed outwardly to provide a space for the reception of flexible fingers 86 secured to caps 87 by means of which those holes 85 which are not in use may be covered.

In addition to the adjustments which must be provided for control of the radio set when it is operating, it may be necessary to provide access to the set for occasional adjustment of other elements. Such elements may include trimming condensers for the tuning condensers 57, 58, and 59, which trimming condensers are adjusted by the screws 89 shown in Fig. 1, and condensers 90 in the intermediate-frequency stages of the radio set, if it is of the superheterodyne type. I therefore provide in the shielding-shell auxiliary openings 91 through which access may be had for the purpose of effecting the adjustment of such elements.

In Figs. 4 and 6, the chassis of the radio set is disposed within the casing in such a position that the mechanical controls pass through one of the side walls of the outer casing. In such a position, as is clear from the drawings, the sleeves 74 project beyond the side walls of the casing-cover 27 so that the clamp nut 78 can be removed, the shafts 76 and connectors 75 withdrawn, and the sleeves 74 themselves unscrewed from their mounting in the collar 73 to permit removal of the casing-cover 27. The Bowden-wire casing 65, as is clear from Fig. 4, passes through a hollow nut 95 and through a lateral opening in a cap 96 which is secured to an ear 97 on the bracket 67 by means of the nut 95. The cap 96, which extends through the notches 82 and 84 and projects beyond the side wall of the cover 27, may have secured to it the shielding sheath 98 of the antenna lead 99.

When the radio set is mounted within the casing in such a position that the rheostat-adjusting shafts 72 project toward the back of the casing, as illustrated in Figs. 1, 3, and 5, the flexible shafts 76 and the Bowden-wire casing 65 extend through the hollow studs 45. Since the sleeves 74, through the medium of which the flexible shafts 76 are connected to the rheostat shafts 72, are of a length sufficient to extend through the wall of the outer casing, they would, unless altered, interfere with the mounting of the radio set within the casing in the position illustrated in Figs. 1, 3, and 5. To prevent any such interference, therefore, I shorten the sleeves 74 when the radio set is to be mounted with such sleeves projecting rearwardly. To facilitate this shortening of the sleeves, I may provide each of them with an annular groove 100 (Fig. 7) marking the place at which the sleeve is to be severed if the flexible shafts and Bowden-wire are to extend through the studs 45.

With the sleeves shortened by cutting them off at the grooves 100, they will clear the inner ends of the screw-threaded flanges 47 by means of which the studs 45 are secured in place. The rear ends of the studs 45 are internally screw-threaded, similarly to the outer ends of the sleeves 74, for the reception of the clamping nuts 78 by means of which the sheaths 79 of the flexible shafts 76 are held in position. The clamping nuts 78 are shown in position in the rear ends of the studs 45 in Figs. 1 and 5.

When the radio set is to be mounted within the casing in the position shown in Figs. 1, 3, and 5, the hollow nut 95, which is used to mount the cap 96 upon the bracket 67, is discarded, and the cap 96 is mounted as shown in Fig. 1, upon the rear end of that stud 45 which is in the plane of the pulley 62.

Whether or not the studs 45 serve as passages for the flexible shafts 76 and the Bowden-wire 63, they are secured to the dash 49 or equivalent portion of an automobile by passing therethrough and being secured in position by clamp-nuts 102 disposed upon opposite sides of the dash.

The use of hollow studs 45 or of equivalent mounting members as both a support for the radio casing and the passage for leading through the dash such elements as the flexible shafts 76, the Bowden-wire 63, and the antenna lead 99 is more fully set forth and claimed in the co-pending application of myself and Walter E. Peek, Serial No. 668,776, filed May 1, 1933, Patent No. 1,965,628, July 10, 1934.

In addition to the two positions of the radio set within the casing illustrated in the drawings, two other positions are possible—namely, a position in which the flexible shafts 76 and Bowden-wire 63 pass through the bottom wall of the outer casing and the position in which they pass through the front wall of the casing. When these elements extend through the bottom wall of the casing, the arrangement is substantially similar to that set forth in Fig. 6, the caps 87 which cover the holes 85 in the bottom wall of the casing being removed, while those which cover the holes in the top wall of the casing are left in place. When the flexible shafts and Bowden-wire are to extend through the front wall of the casing, the sleeves 74 project through the open side of the lining 35 and through the openings 85 in the front wall of the cover 27, the caps 87 for such openings being removed.

Preferably, the overall external dimensions of the shell 16—17—18 are less than the internal dimensions of the lining 35 to provide space between the shell and the lining for the reception of some packing material such as the corrugated paper indicated at 105 in Fig. 1. To avoid confusion in the drawings, the corrugated paper is illustrated only fragmentally in Fig. 1, and may completely surround the shielding shell 16—17—18.

The frame 15, the shielding shell 16—17—18, the lining 35, and the outer casing 26—27—28 are all made of metal and are all grounded to the metallic structure of the automobile through the connection provided by the studs 45 between the dash 49 and the base 26 of the outer casing. To provide a shielding covering for the notches 82' in the lining 35, I may use the auxiliary shielding members 110 one of which is shown in Fig. 11. These are made of thin strips of sheet-metal each of which is folded back on itself along a longitudinal line to receive the edge of the lining 35. Each of the auxiliary shielding members is provided with a projecting portion 111 which overlies the associated notch 82'.

It is obvious that the structure illustrated and described provides great flexibility of installation, which is a great advantage in view of the fact that the radio set must be installed in a wide variety of makes and models of automobiles. The back of the casing can be mounted against the dash of the automobile or other supporting member with the casing either vertical or horizontal; or, if desired, the end of the casing may be mounted against the dash or other supporting member. The radio set may be disposed within the casing in any of four different positions so that the flexible shafts 76, the Bowden-wire 63, and the antenna lead 99 may be brought out on whichever side of the casing is most convenient.

I claim as my invention:

1. In a dash-mounted automobile radio set, a casing enclosing a portion of the radio set, one or more hollow mounting members, said members extending through the dash of the automobile and being secured thereto, one end wall and one side wall of said casing having provisions for the attachment of said mounting members whereby said casing may be mounted with either such side wall or such end wall adjacent the dash, the radio set within the casing including an adjustable device having a movable adjusting member, and a power-transmitting element operatively connected to said movable member and adapted to extend through one of said mounting members.

2. In an an automobile radio set, a casing enclosing a portion of the radio set including an adjustable element having a movable adjusting member, a support, a hollow mounting member extending through said support and secured to said support and casing to support the latter, a power-transmitting element operatively connected to said movable adjusting member and extending outwardly from said casing through said hollow mounting member, a sheath for said power-transmitting element, and means for securing said sheath to said mounting member.

3. In an automobile radio set, a base of general L-shape constituting one side wall and one end wall of a parallelepipedal casing, means for mounting said base upon a portion of an automobile, a cover constituting the other three side walls of the casing, and an end closure constituting the other end wall of the casing, releasable means for securing said cover to said base, releasable means for securing said end closure to said base and cover, and apparatus constituting at least a portion of a radio set disposed within said casing.

4. The invention set forth in claim 3 with the addition that said mounting means includes a hollow member secured to said base, said radio apparatus having a rotatable adjusting member in alinement with said hollow member, and a power-transmitting element operatively connected to said adjusting member and extending through said hollow member.

5. In an automobile radio set, a parallelepipedal casing, means for securing said casing in fixed position in the automobile, a rigid frame fitting within said casing, electrical apparatus constituting at least a part of the radio set mounted on said frame, said frame projecting beyond the limits of the apparatus mounted upon it to engage the walls of said casing and prevent contact of such apparatus therewith, said frame and the apparatus it carries being removable from said casing as a unit and insertable into said casing in any of a plurality of positions angularly displaced from each other about an axis extending longitudinally of the casing, the electrical apparatus mounted on said frame including an adjustable device having a movable adjusting member disposed near one side of the frame, and a flexible power-transmitting element detachably associated with said adjusting member for connecting it to a remote control, the side walls of said casing being respectively provided with openings for the passage of said flexible element in any position of said frame.

6. The invention set forth in claim 5 with the addition that an end wall of said casing is provided with an opening located on the longitudinal axis of the casing for the passage of an electrical connection, an electrical socket mounted on said frame in line with said opening to receive such connector and connected to the electrical apparatus on said frame.

7. The invention set forth in claim 5 with the addition of one or more closures for closing those of said openings through which said flexible element does not pass.

8. In an automobile radio set, a parallelepipedal casing, means for securing said casing in fixed position in the automobile, a rigid frame fitting within said casing, electrical apparatus constituting at least a part of the radio set mounted on said frame, said frame projecting beyond the limits of the apparatus mounted upon it to engage the walls of said casing and prevent contact of such apparatus therewith, said frame and the apparatus it carries being removable from said casing as a unit and insertable into said casing in any of a plurality of positions angularly displaced from each other about an axis extending longitudinally of the casing, and means mounted at one end of said frame on the longitudinal axis of the casing for the reception of a connection adapted to connect the apparatus upon said frame with another portion of the radio set located without the casing, the end wall of said casing being provided with an axial opening for the passage of such a connection.

EARL C. BOOTH.